UNITED STATES PATENT OFFICE.

ROBERT T. HAVENS, OF WILMINGTON, OHIO.

IMPROVED PROCESS FOR PREPARING WOOD FOR BOOTS AND SHOES.

Specification forming part of Letters Patent No. 54,339, dated May 1, 1866; antedated April 16, 1866.

*To all whom it may concern:*

Be it known that I, ROBERT T. HAVENS, of Wilmington, Clinton county, and State of Ohio, have invented a new and useful Process for Producing or Making Wood Flexible for Boots and Shoes; and I do hereby declare the following to be a full and clear description of the same.

To make natural wood flexible, first take one pound of lime, two pounds of commercial potash, or any strong alkali, put in solution of water and immerse the wood for about six days and remove it, after which immerse the wood in a compound made of two pounds of raw linseed-oil and one pound of tallow dissolved with the oil, immerse about six days, as before, after which remove the wood and dry in the shade, when it will be ready for use.

I do not wish to confine myself to any particular kind of wood, as I can soften and make flexible the various kinds of wood desirable for use.

Having thus described my invention, what I claim, and desire to secure by Letters Patent, is—

The process, as described, for the purpose of producing flexible wood for boots and shoes, as specified.

ROBERT T. HAVENS.

Attest:
 WM. DOEGEN,
 JNO. F. LUHRING.